(12) United States Patent
Van Buskirk et al.

(10) Patent No.: US 8,361,301 B2
(45) Date of Patent: Jan. 29, 2013

(54) ELECTROCOATING COMPOSITION COMPRISING A CRATER CONTROL ADDITIVE

(75) Inventors: Ellor James Van Buskirk, Pittsburgh, PA (US); Alan J. Kaylo, Glenshaw, PA (US); Michael G. Sandala, Pittsburgh, PA (US); Debra L. Singer, Wexford, PA (US); Benjamin Kabagambe, Pittsburgh, PA (US); Joseph R. Swanger, Natrona Heights, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 800 days.

(21) Appl. No.: 12/414,737

(22) Filed: Mar. 31, 2009

(65) Prior Publication Data

US 2010/0243455 A1  Sep. 30, 2010

(51) Int. Cl.
*C25D 11/00* (2006.01)
*C07D 251/64* (2006.01)
(52) U.S. Cl. .................. 205/317; 544/196; 524/100
(58) Field of Classification Search .................. 205/317; 544/196; 524/100
See application file for complete search history.

(56) References Cited

U.S. PATENT DOCUMENTS

| 3,661,819 | A | | 5/1972 | Koral et al. | |
|---|---|---|---|---|---|
| 4,102,863 | A | * | 7/1978 | Buchwalter et al. | 528/111 |
| 4,170,579 | A | * | 10/1979 | Bosso et al. | 523/415 |
| 4,647,604 | A | | 3/1987 | Kempter et al. | |
| 5,057,556 | A | * | 10/1991 | Redman | 523/404 |
| 5,157,060 | A | | 10/1992 | Redman | |
| 6,165,338 | A | | 12/2000 | December et al. | |
| 6,190,523 | B1 | | 2/2001 | Tazzia | |
| 2002/0068176 | A1 | | 6/2002 | Yokoyama et al. | |

FOREIGN PATENT DOCUMENTS

| EP | 0229459 | 7/1987 |
|---|---|---|
| EP | 269102 | 11/1987 |
| EP | 1743925 | 1/2007 |
| WO | WO 01/77239 | 10/2001 |
| WO | WO 2004/060945 | 7/2004 |
| WO | WO 2009/118172 | 10/2009 |

OTHER PUBLICATIONS

STN structure search results (Jun. 13, 2012).*

* cited by examiner

*Primary Examiner* — Vu A Nguyen
(74) *Attorney, Agent, or Firm* — Alicia Passerin

(57) ABSTRACT

The present invention relates to an electrodepositable coating composition comprising a crater control additive.

15 Claims, No Drawings

ELECTROCOATING COMPOSITION COMPRISING A CRATER CONTROL ADDITIVE

BACKGROUND OF THE INVENTION

1. Field of the Invention

The present invention relates to an electrodepositable coating composition comprising a crater control additive.

2. Background Information

Various crater control agents, such as those based on acrylates and polybutene dienes, have been utilized in electrodepositable coating compositions in order to impart carter resistance as well as resistance to oil contamination. However, the electrodepositable coating layer that is deposited from such a coating composition typically exhibits poor intercoat adhesion with layers that are subsequently applied onto the electrodepositable coating layer. Moreover, in some instances, an electrodepositable coating composition that contains a crater control agent is not stable when stored at elevated temperatures over a prolonged duration of time. Therefore, when such an unstable electrodepositable coating composition is coated onto a substrate, it has been observed that certain properties of the coating layer (film) that results from the unstable electrodeposited coating composition, such as resistivity, coulombic efficiency, and film build, are difficult to control.

SUMMARY OF THE INVENTION

The present invention is directed to an electrodepositable coating compositions comprising:

(a) an active hydrogen containing ionic salt group containing resin; and (b) an additive having the following structure:

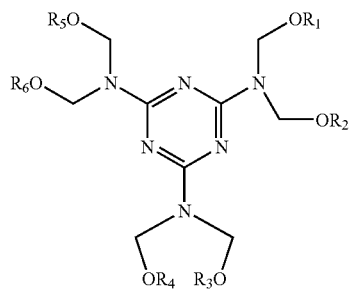

(I)

wherein $R_1$, $R_2$, $R_3$, $R_4$, $R_5$, and $R_6$ comprises —$C(R^I)HCH_2O)_m$—$R^{II}$; wherein m can be 0, 1, 2, or 3, $R^I$ can be H or $C_1$ to $C_6$, and $R^{II}$ can be $C_4$ to $C_{18}$ or $CH_2$—$CH_2$—Y—$R^{IV}$ wherein Y comprises O, S, or C(O)$NR^{III}$, wherein $R^{III}$ can be H or $C_1$-$C_6$ and $R^{IV}$ can be H or $C_1$ to $C_{18}$; and wherein each of $R_1$, $R_2$, $R_3$, $R_4$, $R_5$, and $R_6$ can be the same or different.

The present invention is also directed to a method for making an additive comprising:

reacting an alcohol with a compound having the following structure:

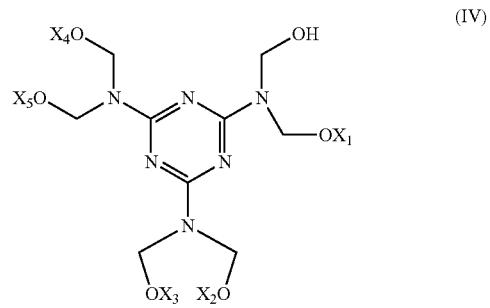

(IV)

wherein one or more of $X_1$, $X_2$, $X_3$, and $X_4$ comprises a chain of $\geq 4$ carbons, and wherein each of $X_1$, $X_2$, $X_3$, and $X_4$ can be the same or different.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Plural encompasses singular and vice versa. For example, although reference is made herein (including the claims) to "an" alcohol, "a" melamine formaldehyde resin, a combination (i.e., a plurality) of alcohols and/or melamine formaldehyde resins can be used.

As used herein, "plurality" means two or more.

When referring to any numerical range of values, such ranges are understood to include each and every number and/or fraction between the stated range minimum and maximum.

It will be understood that the various coating layers that are described herein result from various coating compositions. For example, the electrodeposited coating layer result from an electrodepositable coating composition after such coating composition is substantially cured.

As used herein, the term "cure" refers to a coating wherein any crosslinkable components of the composition are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking (i.e., the crosslink density) can be determined by a variety of methods, such as dynamic mechanical thermal analysis (DMTA) using a Polymer Laboratories MK III DMTA analyzer conducted under nitrogen.

Electrodepositable Coating Composition

The present invention is directed to an electrodepositable coating composition that comprises: (a) an active hydrogen containing ionic salt group containing resin; and (b) an additive. As will be illustrated in greater detail below, it has been found that, in certain instances, addition of the additive to the electrodepositable coating composition not only improves the crater resistance of the electrodepositable coating composition but also the ability of subsequently applied coating compositions to adhere to the coating layer that results from the electrodepositable coating composition described herein when compared to an electrodepositable coating composition that does not comprise the additive.

Accordingly, the present invention is directed to an electrodepositable coating composition comprising: (a) an active hydrogen containing ionic salt group containing resin; and (b) an additive comprising the structure of formula (I)

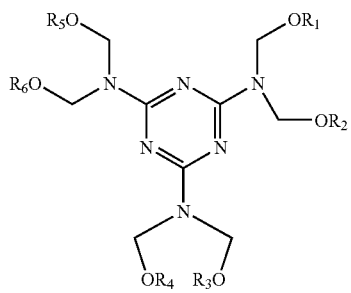

wherein $R_1$, $R_2$, $R_3$, $R_4$, $R_5$, and $R_6$ comprises —$(C(R^I)HCH_2O)_m$—$R^{II}$; wherein m can be 0, 1, 2, or 3, $R^I$ can be H or $C_1$ to $C_6$, and $R^{II}$ can be $C_4$ to $C_{18}$ or $CH_2$—$CH_2$—Y—$R^{IV}$ wherein Y comprises O, S, or C(O)$NR^{III}$, wherein $R^{III}$ can be H or $C_1$-$C_6$ and $R^{IV}$ can be H or $C_1$ to $C_{18}$; and wherein each of $R_1$, $R_2$, $R_3$, $R_4$, $R_5$, and $R_6$ can be the same or different.

In certain embodiments, at least one of $R_1$, $R_2$, $R_3$, $R_4$, $R_5$, and $R_6$ comprises: H as $R^I$, $C_4$ as $R^{II}$, and m=2; and at least one of $R_1$, $R_2$, $R_3$, $R_4$, $R_5$, and $R_6$ comprises: H as $R^I$, $C_4$ as $R^{II}$, and m=0.

In some embodiments, the sum of all the carbons in $R_1$, $R_2$, $R_3$, $R_4$, $R_5$, and $R_6 \geq 24$. For example, in certain embodiments, each of $R_1$, $R_2$, $R_3$, $R_4$, $R_5$, and $R_6$ comprise a chain of 4 contiguous carbons. Accordingly, the sum of all the carbons in $R_1$, $R_2$, $R_3$, $R_4$, $R_5$, and $R_6$ is 24. In other embodiments, each of $R_1$, $R_2$, $R_3$, and $R_4$ comprise a chain of 4 contiguous carbon while $R_5$ and $R_6$ comprise a chain of 6 contiguous carbons. Accordingly, in this embodiment, the sum of all the carbons in $R_1$, $R_2$, $R_3$, $R_4$, $R_5$, and $R_6$ is 28.

In some embodiments, at least one of R1, R2, R3, R4, R5, and R6 comprises an alcohol residue. For instance, in certain embodiments, R1, R4, and R5 comprises the residue of an alcohol. In certain embodiments, the alcohol used in the formation of the structure of formula (I) comprises >3 carbons, such as ÿ 4 carbons. Suitable alcohols that may be used in the present invention include, without limitation, butanol, hexanol, 2-ethylhexanol, ethylene glycol ethers, such as diethyleneglycolethylether and ethylene glycol butyl ether, diglycolamine, propylene glycol, ethanol, 2-propanol, propylene glycol n-propyl ether, propylene glycol methyl ether, dipropylene glycol methyl ether, diethylene glycol propyl ether, diethylene glycol butyl ether, triethylene glycol butyl ether, Bisphenol-A 6 EP polyol, propylene oxide diol, polypropylene oxide triol, n-octanol, tridecanol, 3,5,5 trimethyl n-hexanol, 2-butyl-1-octanol, or combinations thereof.

In certain embodiments, the oxygen content of the additive disclosed herein ranges from 20 to 34. As used herein, "oxygen content" means the mass percent of elemental oxygen in the alkylating species. The mass percent of elemental oxygen can be calculated for the modifying alcohols added to a melamine formaldehyde resin (described below), or can be calculated on the sum total of all alkylating species, including the alkyl groups, present in the starting material (i.e., the melamine formaldehyde resin) as received.

In certain embodiments, the additive comprises <5 weight %, such as 1 weight % to 2 weight %, of the total resin solids of the electrodepositable coating composition.

The electrodepositable coating composition of the present invention can also comprise a film-forming polymer having reactive functional groups. A wide variety of film-forming polymers, which are known in the art, can be used in the present invention so long as the polymers are "water dispersible." As used herein, "water dispersible" means that a material is adapted to be solubilized, dispersed, and/or emulsified in water. The film-forming polymers used in the present invention are ionic in nature. Accordingly, in some embodiments, the film-forming polymer is cationic. In other words, the film-forming polymer comprises cationic salt groups, generally prepared by neutralizing a functional group on the film-forming polymer with an acid, which enables the film-forming polymer to be electrodeposited onto a cathode.

Examples of film-forming polymers suitable for use in cationic electrocoating coating compositions include, without limitation, cationic polymers derived from a polyepoxide, an acrylic, a polyamide, a polyurethane, and/or polyester. In certain embodiments, the film-forming polymer comprises reactive functional groups. As used herein, the phrase "reactive functional group" means hydroxyl, carboxyl, carbamate, epoxy, isocyanate, aceto acetate, amine-salt, mercaptan, or combinations thereof. It should be noted that in some embodiments, the film-forming polymer is a copolymer of the polymers listed in the preceding sentence. In some embodiments, the cationic polymer can be derived by reacting a polyepoxide containing polymer with a cationic salt group former. As used herein, "cationic salt group former" means a material that is reactive with epoxy groups and which can be acidified before, during, or after reaction with the epoxy groups to form cationic salt groups. Suitable materials that can be used as the cationic salt group former include amines such as primary or secondary amines, which can be acidified after reaction with the epoxy groups to form amine salt groups, or tertiary amines, which can be acidified prior to reaction with the epoxy groups and which after reaction with the epoxy groups form quaternary ammonium salt groups. Examples of other cationic salt group formers are sulfides, which can be mixed with acid prior to reaction with the epoxy groups and form ternary sulfonium salt groups upon subsequent reaction with the epoxy groups.

In some embodiments, the main film-forming polymer further comprises cationic amine salt groups, which are derived from pendant and/or terminal amino groups. By "terminal and/or pendant" is meant that primary and/or secondary amino groups are present as a substituent, which are pendant from or in the terminal position of the polymeric backbone, or, alternatively, is an end-group substituent of a group which is pendant and/or terminal from the polymer backbone. In other words, the amino groups from which the cationic amine salt groups are derived are not required to be within the polymeric backbone. The pendant and/or terminal amino groups can have the following structures (II) or (III):

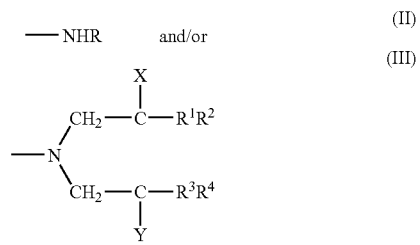

wherein R represents H or $C_1$ to $C_{18}$ alkyl; $R^1$, $R^2$, $R^3$, and $R^4$ are the same or different, and each independently represents H or $C_1$ to $C_4$ alkyl; and X and Y can be the same or different, and each independently represents a hydroxyl group and/or an amino group.

As used in conjunction with structures (II) and (III), "alkyl" is meant alkyl and aralkyl, cyclic or acyclic, linear or branched monovalent hydrocarbon groups. The alkyl groups can be unsubstituted or substituted with one or more heteroaoms, for example, non-carbon, non-hydrogen atoms such as one or more oxygen, nitrogen or sulfur atoms.

The pendant and/or terminal amino groups represented by structures (II) and (III) above can be derived from a compound selected from the group consisting of ammonia, methylamine, diethanolamine, diisopropanolamine, N-hydroxyethyl ethylenediamine, diethylenetriamine, and mixtures thereof. One or more of these compounds is reacted with one or more of the above described polymers, for example, a polyepoxide polymer, where the epoxy groups are ring-opened via reaction with a polyamine, thereby providing terminal amino groups and secondary hydroxyl groups.

In some embodiments, the terminal amino group comprises structure (III) wherein both X and Y, which comprise primary amino groups (e.g., the amino group is derived from diethylenetriamine). It should be understood that in this instance, prior to reaction with the polymer, the primary amino groups can be blocked, for example, by reaction with a ketone such as methyl isobutyl ketone, to form the diketimine. Such ketimines are those described in U.S. Pat. No. 4,104,147, column 6, line 23 to column 7, line 23. The ketimine groups can decompose upon dispersing the amine-epoxy reaction product in water, thereby providing free primary amine groups as curing reaction sites.

If the film-forming polymer comprises reactive functional groups, such as those described in the preceding paragraphs, then the electrodepositable coating composition may further comprise a crosslinking agent ("curing agent") that is reactive with the reactive functional groups of the polymer. Suitable crosslinking agents include, without limitation, aminoplasts, polyisocyanates (including blocked isocyanates, such as non-aromatic blocked polyisocyanates), polyepoxides, beta-hydroxyalkylamides, polyacids, anhydrides, organometallic acid-functional materials, polyamines, polyamides, cyclic carbonates, siloxanes, or combinations thereof. In some embodiments, the curing agent can comprise from 30 weight % to 40 weight % of the total resin solids of the coating composition.

In certain embodiments, the electrodepositable coating composition may further comprise a curing catalyst, which may be used to catalyze the reaction between the crosslinking agent and the reactive functional groups of the film forming polymer. Suitable curing catalysts that may be used as in the present invention include, without limitation, organotin compounds (e.g., dibutyltin oxide, dioctyltin oxide) and salts thereof (e.g., dibutyltin diacetate); other metal oxides (e.g., oxides of cerium, zirconium and/or bismuth) and salts thereof (e.g., bismuth sulfamate and/or bismuth lactate), bicyclic guanidine (as disclosed in U.S. patent application Ser. No. 11/835,600), zinc, or combinations thereof.

The electrodepositable coating composition disclosed herein is typically supplied as two components: (1) a main vehicle ("clear resin feed") and (2) a grind vehicle ("pigment paste"). In general, (1) the main vehicle comprises (a) a film-forming polymer (e.g., an active hydrogen-containing ionic salt group-containing resin), (b) a crosslinking agent, and (c) any additional water-dispersible, non-pigmented components (e.g., catalysts, hindered amine light stabilizers). In general, (2) the grind vehicle comprises (d) one or more pigments (e.g., titanium dioxide, carbon black), (e) a water-dispersible grind resin, which can be the same or different from the film-forming polymer, and, optionally, (f) additives such as catalysts, antioxidants, biocides, defoamers, surfactants, wetting agents, dispersing aids, clays, hindered amine light stabilizers, UV light absorbers and stabilizers, or combinations thereof. An electrodeposition bath, which contains the electrodepositable coating composition of the present invention, can be prepared by dispersing components (1) and (2) in an aqueous medium that typically comprises water and/or coalescing solvents, which are known in the art.

Alternatively, the electrodepositable coating composition disclosed herein may also be supplied as a single component. That is, both the (1) main vehicle and (2) grind vehicle may be introduced as one package.

Method for Forming the Additive

The additive disclosed herein may be formed by reacting an alcohol, such as those listed above, with the a compound having the following structure:

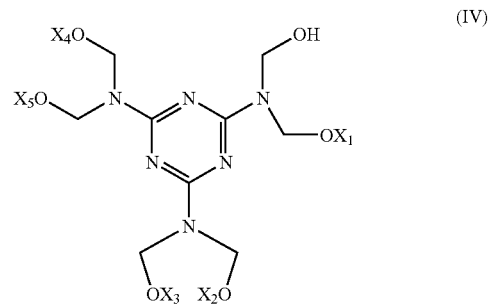

wherein one or more of $X_1$, $X_2$, $X_3$, $X_4$ and $X_5$ comprises a chain of $\geq 4$ carbons, and wherein each of $X_1$, $X_2$, $X_3$, $X_4$ and $X_5$ can be the same or different. For example, in some embodiments, $X_1$ and $X_2$ can comprise a chain of 4 contiguous carbons while $X_3$ and $X_4$ can comprise a chain of $\leq 4$ contiguous carbons.

In certain embodiments, each of $X_1$, $X_2$, $X_3$, $X_4$ and $X_5$ comprises a chain of $\geq 4$ contiguous carbons. For example, in some embodiments, $X_1$ and $X_2$ can comprise a chain of 4 contiguous carbons while $X_3$ and $X_4$ can comprise a chain of 6 contiguous carbons. In other embodiments, each of $X_1$, $X_2$, $X_3$, $X_4$ and $X_5$ can comprise a chain of 4 contiguous carbons.

In some embodiments, the compound having the structure (IV) is a melamine formaldehyde resin. Suitable melamine formaldehyde resins that may be used in the present invention include, without limitation, CYMEL 303, 327, 370, 1130, 1133, 1168, and 1156 (commercially available from Cytec Industries Inc.), RESIMINE 741, 745, 755, and 797 (commercially available from INEOS), LUWIPAL L-044 (commercially available from BASF Corp.), or combinations thereof.

In certain embodiments, the (b) additive is formed by reacting the melamine formaldehyde resin with the alcohol in a reaction vessel using techniques known in the art. In certain embodiments, the mixture of the (b) additive and the alcohol is held at a temperature ranging from 110° C. to 130° C. for a period of time ranging from 2 hours to 6 hours, such as from 3 hours to 4 hours. In certain embodiments, the molar ratio of melamine formaldehyde resin to alcohol ranges from 1:2 to 1:10.

Substrate with a Coating System

The electrodepositable coating composition described herein may be applied alone or as part of a coating system that can be deposited onto a number of different substrates. The coating system typically comprises a number of coating layers. A coating layer is typically formed when a coating composition that is deposited onto the substrate is substantially cured or dried by methods known in the art (e.g., by thermal heating).

Suitable substrates that can be coated with the electrodepositable coating composition described herein include, without limitation, metal substrates, metal alloy substrates, and/or substrates that have been metalized, such as nickel plated plastic. In some embodiments, the metal or metal alloy can be aluminum and/or steel. For example, the steel substrate could be cold rolled steel, electrogalvanized steel, and hot dipped galvanized steel. Moreover, in some embodiments, the substrate may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks. It will also be understood that, in some embodiments, the substrate may be pretreated with a pretreatment solution, such as a zinc phosphate solution as described in U.S. Pat. Nos. 4,793,867 and 5,588,989 or a zirconium containing solution such as described in U.S. patent application Ser. Nos. 11/610,073 and 11/833,525. Alternatively, in other embodiments, the substrate is not pretreated with a pretreatment solution prior to coating the substrate with the coating composition described herein.

In certain embodiments, the electrodepositable coating composition of the present invention is applied over a bare (i.e., non-pretreated) substrate. However, in some embodiments, the electrodepositable coating composition of the present invention can be applied to a substrate that has been pretreated. After the electrodepositable coating composition is cured, a primer-surfacer coating composition is applied onto at least a portion of the electrodepositable coating composition. The primer-surfacer coating composition is typically applied to the electrodepositable coating layer and cured prior to a subsequent coating composition being applied over the primer-surfacer coating composition.

After the electrodepositable coating composition is cured, a primer-surfacer coating composition is applied onto at least a portion of the electrodepositable coating composition. The primer-surfacer coating composition is typically applied to the electrodepositable coating layer and cured prior to a subsequent coating composition being applied over the primer-surfacer coating composition.

The primer-surfacer layer that results from the primer-surfacer coating composition serves to enhance chip resistance of the coatings system as well as aid in the appearance of subsequently applied layers (e.g., color imparting coating composition and/or substantially clear coating composition). As used herein, "primer-surfacer" refers to a primer composition for use under a subsequently applied coating composition, and includes such materials as thermoplastic and/or crosslinking (e.g., thermosetting) film-forming resins generally known in the art of organic coating compositions. Suitable primers and primer-surfacer coating compositions include spray applied primers, as are known to those skilled in the art. Examples of suitable primers include several available from PPG Industries, Inc., Pittsburgh, Pa., as DPX-1791, DPX-1804, DSPX-1537, GPXH-5379, OPP-2645, PCV-70118, and 1177-225A. Another suitable primer-surfacer coating composition that can be utilized in the present invention is the primer-surfacer described in U.S. patent application Ser. No. 11/773,482, which is incorporated in its entirety herein by reference.

It should be noted that in some embodiments, the primer-surfacer coating composition is not used in the coating system. Therefore, a color imparting coating composition can be applied directly onto the cured electrodepositable coating composition.

In some embodiments, a color imparting coating composition (hereinafter, "basecoat") is deposited onto at least a portion of the primer surfacer coating layer (if present). Any basecoat coating composition known in the art may be used in the present invention. It should be noted that these basecoat coating compositions typically comprise a colorant.

In certain embodiments, a substantially clear coating composition (hereinafter, "clearcoat") is deposited onto at least a portion of the basecoat coating layer. As used herein, a "substantially clear" coating layer is substantially transparent and not opaque. In certain embodiments, the substantially clear coating composition can comprise a colorant but not in an amount such as to render the clear coating composition opaque (not substantially transparent) after it has been cured. Any clearcoat coating composition known in the art may be used in the present invention. For example, the clearcoat coating composition that is described in U.S. Pat. Nos. 5,989,642, 6,245,855, 6,387,519, and 7,005,472 can be used in the coating system. In certain embodiments, the substantially clear coating composition can also comprise a particle, such as a silica particle, that is dispersed in the clearcoat coating composition (such as at the surface of the clearcoat coating composition after curing).

One or more of the coating compositions described herein can comprise colorants and/or other optional materials, which are known in the art of formulated surface coatings. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the coating composition described herein.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348, filed June 24, 2004, U.S. Provisional Application No. 60/482,167, filed Jun. 24, 2003, and U.S. patent application Ser. No. 11/337,062, filed Jan. 20, 2006.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating composition described herein. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919, filed Jul. 16, 2004.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

In addition to the materials described above, the coating composition can also comprise an organic solvent. Suitable organic solvents that can be used in the coating composition include any of those listed in the preceding paragraphs as well as butyl acetate, xylene, methyl ethyl ketone, or combinations thereof.

It will be further appreciated that one or more of the coating compositions that form the various coating layers described herein can be either "one component" ("1K"), "two component" ("2K"), or even multi-component compositions. A 1K composition will be understood as referring to a composition wherein all of the coating components are maintained in the same container after manufacture, during storage, etc. A 2K composition or multi-component composition will be understood as referring to a composition wherein various components are maintained separately until just prior to application. A 1K or 2K coating composition can be applied to a substrate and cured by any conventional means, such as by heating, forced air, and the like.

The coating compositions that form the various coating layers described herein can be deposited or applied onto the substrate using any technique that is known in the art. For example, the coating compositions can be applied to the substrate by any of a variety of methods including, without limitation, spraying, brushing, dipping, and/or roll coating, among other methods. When a plurality of coating compositions are applied onto a substrate, it should be noted that one coating composition may be applied onto at least a portion of an underlying coating composition either after the underlying coating composition has been cured or prior to the underlying coating composition being cured. If the coating composition is applied onto an underlying coating composition that has not been cured, both coating compositions may be cured simultaneously.

The coating compositions may be cured using any technique known in the art such as, without limitation, thermal energy, infrared, ionizing or actinic radiation, or by any combination thereof. In certain embodiments, the curing operation can be carried out at temperatures $\geq 10°$ C. In other embodiments, the curing operation can be carried out at temperature $\leq 246°$ C. In certain embodiments, the curing operation can carried out at temperatures ranging between any combination of values, which were recited in the preceding sentences, inclusive of the recited values. For example, the curing operation can be carried out at temperatures ranging from 120° C.-150° C. It should be noted, however, that lower or higher temperatures may be used as necessary to activate the curing mechanisms.

In certain embodiments, one or more of the coating compositions described herein is a low temperature, moisture curable coating compositions. As used herein, the term "low temperature, moisture curable" refers to coating compositions that, following application to a substrate, are capable of curing in the presence of ambient air, the air having a relative humidity of 10% to 100%, such as 25% to 80%, and a temperature in the range of −10° C. to 120° C., such as 5° C. to 80° C., in some cases 10° C. to 60° C. and, in yet other cases, 15° C. to 40° C.

The dry film thickness of the coating layers described herein can range from 0.1 micron to 500 microns. In other embodiments, the dry film thickness can be $\leq 125$ microns, such as $\leq 80$ microns. For example, the dry film thickness can range from 15 microns to 60 microns.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example 1

Synthesis of Additive 248.8 grams of CYMEL 1156 (n-butylated melamine resin available from Cytek, Industries Inc.), 250 grams 2-(2-butyoxyethoxy)ethanol, and 1.7 grams phenyl acid phosphate were added to one liter flask and slowly heated to 120° C. The mixture was then held at this temperature for four hours. Upon completion of the hold, the reaction was complete and the solution was poured out of the flask.

Example 2

Control Acrylic Electrocoat (No Additive)

| RAW MATERIAL | Parts (grams) |
| --- | --- |
| CR937[1] | 1487.7 |
| CP639[2] | 120.5 |
| Deionized water | 2192 |

[1]cationic acrylic resin available from PPG Industries, Inc.
[2]black cationic pigment paste available from PPG Industries, Inc.

The CR937 resin was placed in a one gallon plastic container with approximately 500 grams of deionized water. This mixture was stirred slowly using an electronic mixer and paddle blade. The CP639 paste was placed in a plastic beaker and diluted to about 500 ml. with deionized water. The pigment paste and water was stirred well with a metal spatula and then added slowly to the resin water mixture under agitation. The remaining water was used to rinse the pigment paste from the beaker into the agitated paint bath. The bath was allowed to stir overnight prior to coat out.

Example 3

Acrylic Electrocoat+Additive of Example 1

| RAW MATERIAL | Parts (grams) |
| --- | --- |
| CR937[1] | 1469.8 |
| CP639[2] | 120.5 |
| Additive of Example 1 | 10 |
| Deionized water | 2205 |

[1]cationic acrylic resin available from PPG Industries, Inc.
[2]black cationic pigment paste available from PPG Industries, Inc.

The electrocoat paint bath in Example 3 was made in a similar fashion to Example 2 with the following exception: the Additive of Example 1 was added to the CP639 pigment paste. This mixture was agitated vigorously using a cowles (high speed disperser) blade for 30 minutes. This mixture was then reduced with deionized water and added to the paint bath as in Example 1.

Coatouts

Both electrocoat baths (Examples 2 and 3) were filtered through a 10 micron cloth filter into a plastic coating tube. The paint baths were agitated using a magnetic stirrer and bath temperature was maintained using a stainless steel cooling coil which also served as the anode for the electrodeposition process.

Coat outs were performed in the usual manner of cathodic electrodeposition. In this case the cathode was a cold rolled steel panel pretreated with Chemfos 710. The 4 inch by 12 inch panels were immersed 9½ inches into the paint bath. The bath temperature was 80° F. and the power supply was set for an amperage limit of 1.2 amps. Panels were coated for 2 minutes at 100 volts. Following coat out the panels were spray rinsed with deionized water and allowed to dry for 10 minutes. The coated panels were then baked for 30 minutes in a forced air electric oven set to 350° F.

Crater Resistance and Topcoat Adhesion

Duplicate coated panels were run for each electrocoat bath. Results of defect (crater) resistance and topcoat adhesion are summarized in table 1.

For crater resistance a 4 inch by 12 inch paper template with a 1 inch by 1 inch square hole cut in the center was placed over each coated panel. The number of defects (craters) in this area was recorded for each panel.

To test topcoat adhesion a sample of JTA44248R, (silver metallic basecoat available from PPG Industries, Inc.), was drawn down on each coated panel using a 3 mil drawdown bar. Following the drawdown, samples were flashed for 10 minutes and then baked for 30 minutes at 265° F. in a gas oven. The basecoat was then scribed using a multi-blade claw with 2 mm spaced teeth. Two sets of scribes were made perpendicular to each other such that 2 mm by 2 mm square cuts were made through the paint film. Paint film adhesion was tested by placing 3M 898 tape over the scribed area and then removing it rapidly. Adhesion is recorded on a scale from 0 to 10, where 0 equals complete paint removal, (poor adhesion), and 10 equals no paint removal, (good adhesion).

The results show that use of the additive in this cationic acrylic paint reduces crater count and improves topcoat adhesion.

TABLE 1

| SAMPLE | FILM BUILD | DEFECT COUNT | TOPCOAT ADHESION |
|---|---|---|---|
| CONTROL (Example 2) | 0.96 mil | 16 | 0 |
| CONTROL (Example 2) | 0.97 mil | 18 | 0 |
| Additive (Example 3) | 0.96 mil | 0 | 8 |
| Additive (Example 3) | 0.92 mil | 1 | 8 |

What is claimed is:

1. An electrodepositable coating compositions comprising:
   (a) cationic salt group containing resin comprising reactive functional groups; and
   (b) a compound having the following structure:

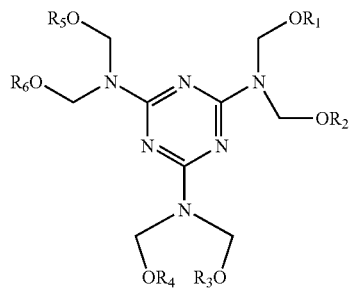

(I)

wherein $R_1$, $R_2$, $R_3$, $R_4$, $R_5$, and $R_6$ comprises —$C(R^I)HCH_2O)_m$—$R^{II}$; wherein m is 0, 1, 2, or 3, $R^I$ is H or has 1 to 6 carbon atoms, and $R^{II}$ has 4 to 18 carbon atoms or $CH_2$—$CH_2$—Y—$R^{IV}$, wherein Y comprises O, S, or $C(O)NR^{III}$, wherein $R^{III}$ is H or has 1 to 6 carbon atoms and $R^{IV}$ is H or has 1 to 18 carbon atoms; and wherein at least one of $R_1$, $R_2$, $R_3$, $R_4$, $R_5$, and $R_6$ comprises: H as $R^I$, $R^{II}$ has 4 carbon atoms, and m=1, 2, or 3; and wherein at least one of $R_1$, $R_2$, $R_3$, $R_4$, $R_5$, and R6 comprises: H as $R^I$, $R^{II}$ has 4 carbon atoms, and m=0.

2. The electrodepositable coating composition according to claim 1, wherein the sum of all the carbons in $R_1$, $R_2$, $R_3$, $R_4$, $R_5$, and $R_6 \geq 24$.

3. The electrodepositable coating composition according to claim 1, wherein at least one of $R_1$, $R_2$, $R_3$, $R_4$, $R_5$, and $R_6$ comprises a residue of butanol.

4. The electrodepositable coating composition according to claim 1, wherein (a) comprises an acrylic resin, a polyester resin, a polyamide, a polyurethane resin, epoxy resin, or a combination thereof.

5. The electrodepositable coating composition according to claim 4, wherein the electrodepositable coating composition further comprises a crosslinking agent, said crosslinking agent comprising a non-aromatic blocked polyisocyanate.

6. The electrodepositable coating composition according to claim 1, wherein (b) comprises <5 weight % of the total resin solids of the electrodepositable coating composition.

7. The electrodepositable coating composition according to claim 1, wherein (b) comprises 1 weight % to 2 weight % of the total resin solids of the electrodepositable coating composition.

8. The electrodepositable coating composition of claim 1, wherein after application to a substrate and after curing, the cured coating demonstrates improved adhesion to a topcoat relative to cured electrodeposited coating that does not comprise the (b) compound.

9. A substrate coated at least in part with the electrodepositable coating composition of claim 1.

10. The substrate according to claim 9, wherein at least a portion of the electrodepositable coating composition is coated with another coating composition.

11. A method for making a an electrodepositable coating composition comprising:
    reacting an alcohol with a compound having the following structure:

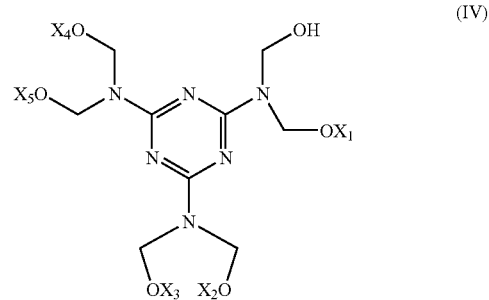

(IV)

wherein one or more of $X_1$, $X_2$, $X_3$, $X_4$, and $X_5$ comprises a chain of $\geq 4$ carbons, and wherein each of $X_1$, $X_2$, $X_3$, $X_4$, and $X_5$ is the same or different,
    to produce a compound having the following structure:

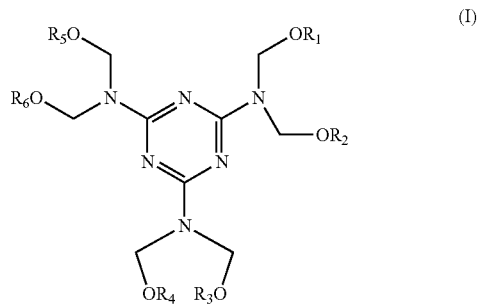

(I)

wherein $R_1$, $R_2$, $R_3$, $R_4$, $R_5$, and $R_6$ comprises —$C(R^I)HCH_2O)_m$—$R^{II}$; wherein m is 0, 1, 2, or 3, $R^I$ is H or has 1 to 6 carbon atoms, and $R^{II}$ has 4 to 18 carbon atoms or $CH_2$—$CH_2$—Y—$R^{IV}$, wherein Y comprises O, S or $C(O)NR^{III}$ wherein $R^{III}$ is H or has 1 to 6 carbon atoms and $R^{IV}$ is H or has 1 to 18 carbon atoms; and wherein at least one of $R_1$, $R_2$, $R_3$, $R_4$, $R_5$, and $R_6$ comprises: H as $R^I$, $R^{II}$ has 4 carbon atoms, and m=1, 2, or 3; and wherein at least one of $R_1$, $R_2$, $R_3$, $R_4$, $R_5$, and R6 comprises: H as $R^I$, $R^{II}$ has 4 carbon atoms, and m=0; and
    combining the compound with a cationic salt group containing resin to produce the electrodepositable coating composition.

12. The method according to claim 11, wherein each of $X_1$, $X_2$, $X_3$, $X_4$, and $X_5$ comprises a chain of $\geq 4$ carbons.

13. The method according to claim 11, wherein the alcohol comprises glycol ether, butanol, hexanol, 2-ethylhexanol, or combinations thereof.

14. The method according to claim 11, wherein the cationic salt group containing resin comprises an acrylic resin, a polyester resin, a polyamide, a polyurethane resin, or combinations thereof.

15. The method according to claim 11, wherein the coating composition further comprises a crosslinking agent, said crosslinking agent comprising a non-aromatic blocked polyisocyanate.

* * * * *